United States Patent [19]

Stanfield

[11] Patent Number: 5,372,510
[45] Date of Patent: Dec. 13, 1994

[54] SHOELACE TYING AID

[76] Inventor: James S. Stanfield, P.O. Box 41058, Santa Barbara, Calif. 93140

[21] Appl. No.: 58,450

[22] Filed: May 7, 1993

Related U.S. Application Data

[63] Continuation-in-part of Ser. No. 491,560, Mar. 12, 1990, Pat. No. 5,209,667.

[51] Int. Cl.$^5$ ............................................. G09B 19/24
[52] U.S. Cl. .................. 434/260; 24/712.2; 24/115 H; 132/279
[58] Field of Search ............ 132/278, 279; 434/260, 434/83; 24/115 H, 115 K, 132 R, 543, 712, 712.1, 712.2, 712.4, 712.5, 712.6, 712.7, 713, 714, 714.6

[56] References Cited

U.S. PATENT DOCUMENTS

| | | |
|---|---|---|
| 330,319 | 11/1885 | Gurney . |
| 481,425 | 8/1892 | Robinson . |
| 605,300 | 6/1898 | Sammis . |
| 816,283 | 3/1906 | Weinman . |
| 1,529,257 | 3/1925 | Lampl ............... 24/115 H |
| 1,624,564 | 4/1927 | Shetzline . |
| 2,527,242 | 10/1950 | Clark ................ 434/260 |
| 2,861,313 | 11/1958 | Ruf . |
| 2,877,526 | 3/1959 | Simpson ............ 24/132 R |
| 3,070,863 | 1/1963 | Eberwein ........... 24/712.2 |
| 4,258,456 | 3/1981 | Thurston et al. ...... 24/543 |
| 4,721,468 | 1/1988 | Alexander et al. ..... 434/260 |
| 4,842,522 | 6/1989 | Alexander . |
| 5,022,127 | 6/1991 | Ang .................. 24/712.2 |
| 5,240,418 | 8/1993 | Silverman et al. ..... 434/260 |

*Primary Examiner*—Richard J. Apley
*Assistant Examiner*—Karen A. Jalbert
*Attorney, Agent, or Firm*—Arthur Freilich; Robert D. Hornbaker; Leon D. Rosen

[57] ABSTRACT

A combination shoelace and joining device is provided for use by young children or the handicapped, to aid in tying a bow in a shoelace that is mounted on a shoe. The joining device (16, FIG. 2) has a pair of permanently connected shoelace holding portions (40, 46), with a first portion (46) substantially permanently mounted on a shoelace part (32) and a second portion (40) which is child-mountable on a second shoelace part (34) to hold a shoelace end portion in a loop configuration which aids in tying a bow. Each shoelace holding portion forms a passage part (70, 72, FIG. 4) through which one of the shoelace parts extends. One joining device includes a pair of clamp parts (42, 44) that can be clamped around the second shoelace part, and that forms the second joining portion. The device includes a flexible strip (46) that holds the clamp parts together and that forms the first holding portion. A teaching kit (100, FIG. 6) includes a joining device (16) mounted on a short teaching shoelace (110) that is threaded on a shoe device (102) in the form of a cardboard plate representing a shoe.

10 Claims, 2 Drawing Sheets

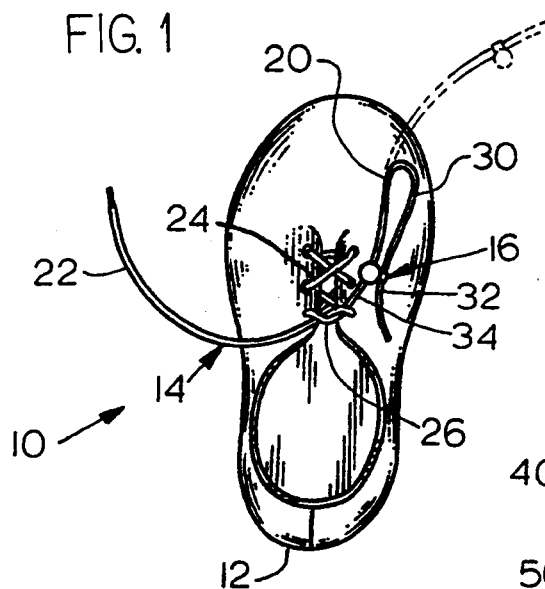
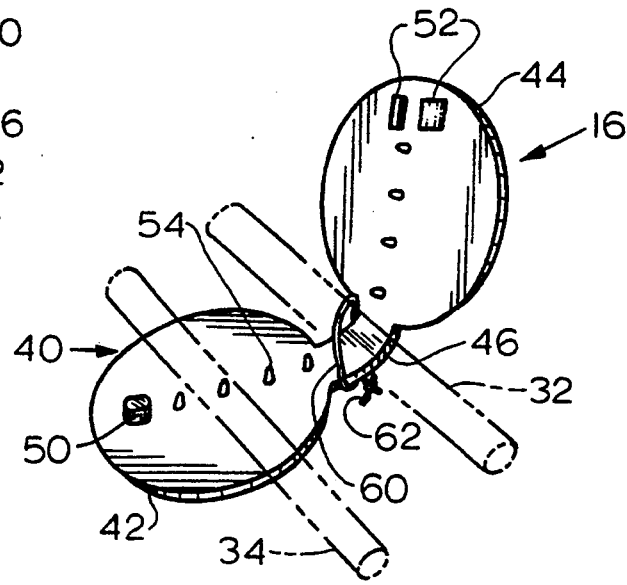
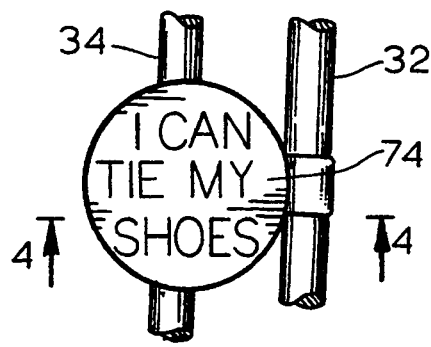
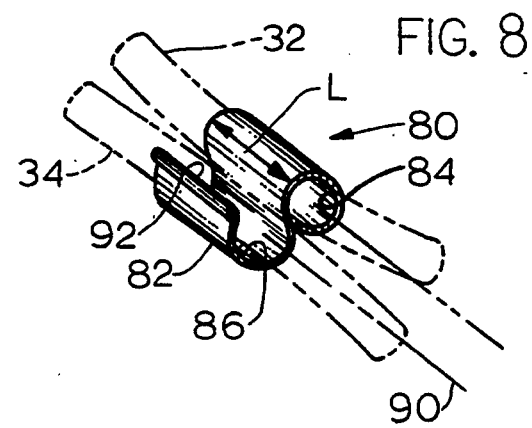
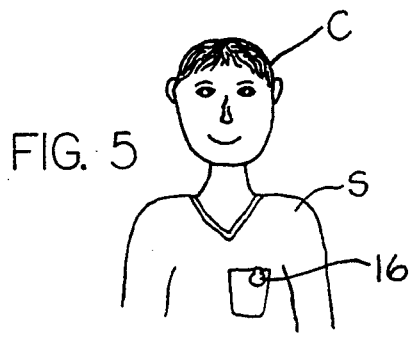
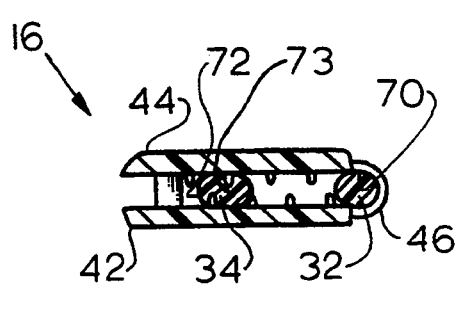

SHOELACE TYING AID

This is a continuation-in-part of application Ser. No. 07/491,560, filed Mar. 12, 1990, now Pat. No. 5,209,667.

BACKGROUND OF THE INVENTION

Young children and retarded persons often experience great difficulty in tying their shoelaces into bows. A major difficulty encountered by such persons is in holding one end portion of a shoelace in a loop configuration, while manipulating the other end portion as to form a second loop and wrap and thread the loops. My earlier Pat. No. 4,842,522 by Alexander and Stanfield describes the permanent fastening of VELCRO hook and loop elements to two parts of a shoelace end portion, so a child can bring the VELCRO elements together to maintain a first loop. However, applicant has found such VELCRO material not satisfactory. The hook element of the VELCRO material lying on a shoe, tends to pick up dirt, so it becomes messy. The added bulk of VELCRO elements can make shoelaces hard to thread through the eyelets of a shoe when installing them. Many children's shoes come with attractive laces of the proper length for tying that particular shoe, and it would be desirable if the original shoelace could be used while still providing help to a child or retarded person in tying a bow.

SUMMARY OF THE INVENTION

In accordance with one embodiment of the present invention, a combination of shoe, shoelace, and shoelace joining device is provided, which aids young children or the handicapped in the tying of a bow by holding a pair of shoelace parts together to maintain a loop. The joining device has a pair of adjacent and permanently connected holding portions that each forms a passage part through which a length of shoelace passes, with the shoelace parts lying primarily parallel to each other. A first of the shoelace-holding portions is substantially permanently attached to a first shoelace part so a child cannot readily remove it therefrom. A second holding portion is child-mountable on the second shoelace part to hold the shoelace parts together to maintain a loop. The joining device can include a pair of clamp members which are held together by a flexible band which is permanently tied to the first shoelace part. A child clamps the clamp members around the second shoelace part to temporarily hold the shoelace parts together.

The joining device can be mounted on a short teaching shoelace which lies on a display that represents a shoe.

The novel features of the invention are set forth with particularity in the appended claims. The invention will be best understood from the following description when read in conjunction with the accompanying drawings.

BRIEF DESCRIPTION OF THE DRAWINGS

FIG. 1 is an isometric view of a combination of shoe, shoelace, and joining device, showing how the joining device maintains a shoelace end portion in a loop configuration.

FIG. 2 is an isometric view of the joining device of FIG. 1, with the clamp in an open position.

FIG. 3 is a plan view of the joining device of FIG. 1, showing the congratulatory message thereon.

FIG. 4 is a sectional view taken on the line 4—4 of FIG. 3.

FIG. 5 is a front elevation view of a child wearing the clamp of FIG. 3 on his shirt.

FIG. 8 is an isometric view of a shoelace joining device constructed in accordance of another embodiment of the invention.

DESCRIPTION OF THE PREFERRED EMBODIMENTS

Figure 6:
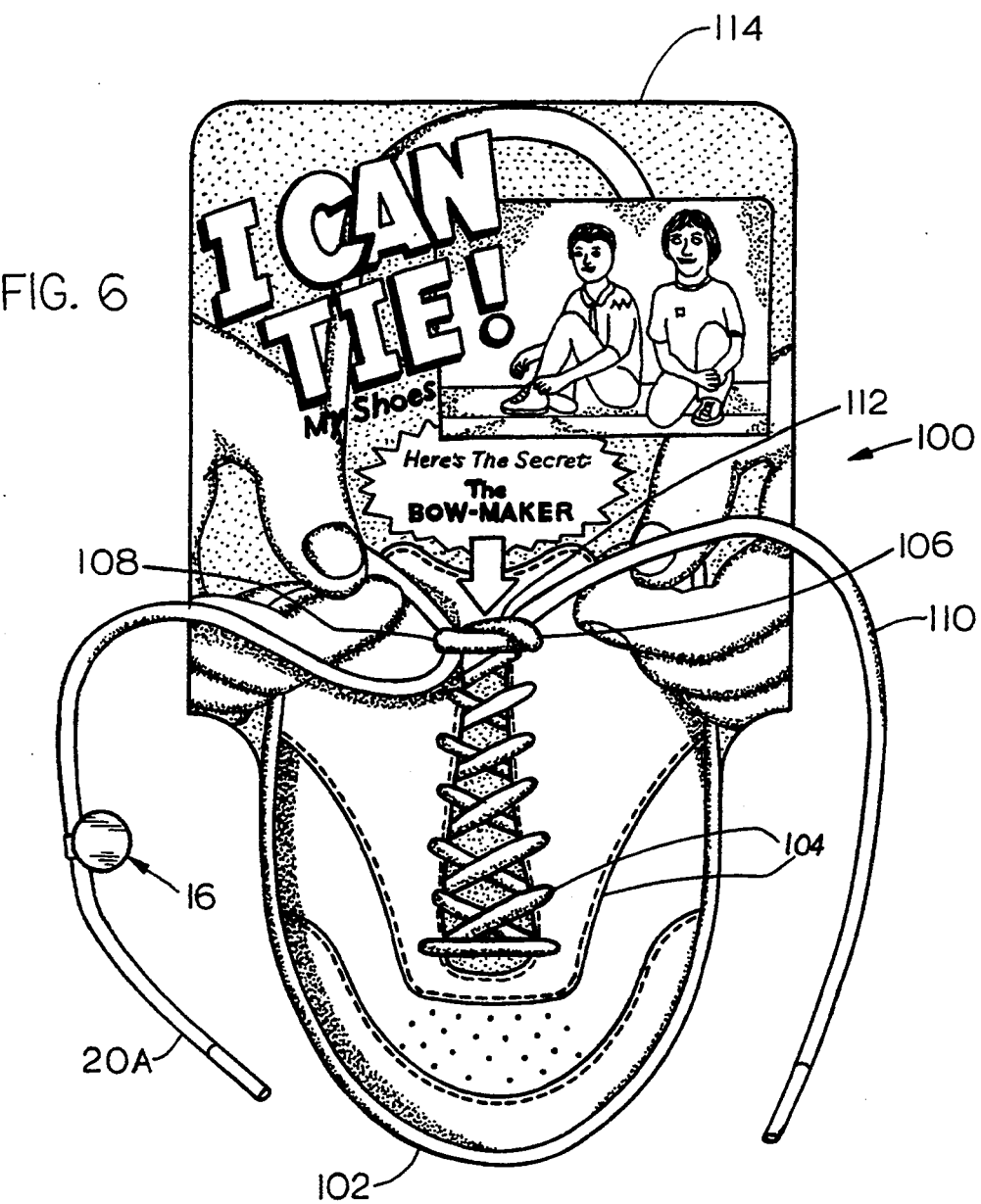
FIG. 6 is a plan view of a teaching kit which includes the joining device of FIG. 2.

FIG. 1 illustrates a combination 10 of a child's shoe 12, a shoelace 14 threaded onto the shoe, and a shoelace joining device 16 mounted on the shoelace. The shoelace has first and second end portions 20, 22 that project from opposite eyelets of the shoe and that lie on opposite sides of the shoelace middle 24. A common shoelace tying technique involves forming a single interlacement 26 of the shoelace end portions, followed by the forming of a loop 30 in the first shoelace end portion 20. Then, a second loop may be formed in the second shoelace end portion 22, and the loops are wrapped and threaded one through the other to form a bow.

Perhaps the most troublesome step in tying a bow is in maintaining the first loop 30 intact while forming a second loop and wrapping and threading the loops. Applicant previously used VELCRO hook and loop elements to keep the loop intact, but these have the disadvantages described above, of picking up dirt, enlarging the shoelace which made initial threading difficult, and preventing use of original or common store-bought shoelaces of proper length.

In order to form and maintain the loop 30, a child brings outer and inner shoelace parts 32, 34 of the first shoe end portion 20 together, and keeps them together without the child's hand. Applicant's shoelace joining device 16 accomplishes this, without using a dirt-accumulating device, and by the use of a device that can be readily attached by an adult to an existing common shoelace.

FIG. 2 illustrates the shoelace joining device 16 which holds outer and inner shoelace parts 32, 34 together. The device includes a clamp 40 comprising first and second clamp parts or members 42, 44 that can clamp a shoelace part 34 between them, and that form a first shoelace holding portion of the joining device. The shoelace joining device also includes a flexible connection in the form of a strip 46 which joins the clamp members and that forms a second shoelace holding portion. The device illustrated in FIG. 2 has been known in the prior art for use as a barrette to hold to the hair of a girl. A first latch part 50 on the first clamp member is latched to a second latch part 52 formed by a pair of arms on the second clamp member. When the clamp members are moved down against each other with a moderate force such as two to three pounds, the latch parts snap together with a notable "click" sound and feel. Approximately the same force can pry apart the two clamp members. This relative low force of preferably less than ten pounds and more preferably no more than five pounds, can be applied by young children of at least about four years of age, to attach and detach the clamp. The clamp members have projections 54 that fix the clamped shoelace in place.

The first shoelace-holding portion 46 formed by the strip, is attached to the shoelace outer part 32 by a tie 60. The tie 60 can be in the form of a piece of wire such as copper wire, which an adult can readily use to encircle the shoelace part 32 and the strip 46, and with the ends of the wire joined at 62 by twisting them one about the other. This attachment of the joining device to the first shoelace part may be considered to be permanent, in that it is not readily removed by a child (of an age of 5) and is expected to remain indefinitely on the same shoelace part throughout many tyings and untyings of the shoelace. However, an adult can detach the tie, as by cutting the wire with a scissors, or unwinding the wire ends from each other. In any case, detachment of the tie 42 is much more difficult than release of the clamp 40.

Applicant prefers to permanently attach the joining device 16 to the outer part 32 of the shoelace, which is the part furthest from the second end portion 22 of the shoelace. This results in the permanently attached joining device 16 not interfering with forming of the interlacement 26. After a child forms the interlacement 26, he brings the joining device 16 on the outer shoelace part 32 to the inner shoelace part 34 and clamps the clamp members around the inner shoelace part 34. FIG. 4 shows the joining device 16 joined to the shoelace parts 32, 34, with each shoelace part extending through a passage 70, 72 in the joining device that surrounds the shoelace part. The clamp members 42, 44 press against opposite sides of the shoelace part 34 that lie on opposite sides of the shoelace centerline 73. The passages hold the shoelace parts so they extend primarily parallel to each other. Thus, the shoelace pads are held together by a device that is not completely permanently attached to the shoelaces by gluing or sewing in place, which would make it more difficult for an adult to attach the joining device or remove it for another use.

FIG. 3 shows the shoelace parts 32, 34 joined by the joining device 16. Applicant prefers to place a congratulatory message 74 on one of the clamp members, as by a sticker attached thereto. The particular message "I Can Tie My Shoes" congratulates the child on his achievement. After a child has used the joining device long enough so he can tie a bow without the use of the joining device, an adult can remove the joining device from the shoelace, as described above. As shown in FIG. 5, the joining device 16 then can be attached to the shirt S or other clothing item of a child C, with the message being displayed. The fact that the child can display the message after he has learned to tie a bow, encourages the child to learn instead of relying on others to tie his shoelaces.

The joining device 16, which includes the clamp 40 and tie 60, may be sold apart from the shoe and shoelace. An adult attaches the clamp to a shoelace with the tie as shown, so the adult does not have to discard an original shoelace that comes with a shoe or find a shoelace of attractive color and correct length which already has a joining device built in. If necessary, the adult can mark the shoelace part 34 as with a marker pen.

FIG. 6 illustrates a teaching kit 100 which includes a shoe device 102 in the form of a display comprising a plate-like device of cardboard with marking 104 depicting part of a shoe. The cardboard sheet has a pair of eyelets 106, 108. A short teaching shoelace 110 is threaded through the eyelets and tied in an interlace merit 112. The shoelace has only a short (e.g. one inch long) portion hidden behind the shoe device under the interlacement. The joining device is joined to one end portion 20A of the shoelace (by the tie 60 of FIG. 2).

The kit is provided as shown in FIG. 6. A child learns to tie a bow, with the child facing the top 114 of the shoe device. Afterward, the joining device can be transferred (by an adult) to the shoelace of the child's shoe.

Figure 7:
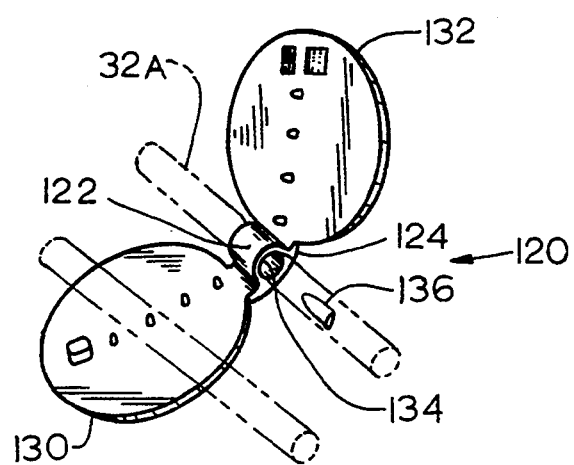
FIG. 7 is an isometric view of a joining device of another embodiment of the invention.

FIG. 7 illustrates a modified clamp joining device 120. This device is similar to that of FIG. 2 except that it includes a tie 122 in the form of a tube that is molded into the joint or strip 124 that connects the clamp members 130, 132. The tubular tie is similar to the tie 60 except that the tie 122 is longer and is integrally molded into the strip 124. The hole 134 in the tubular tie is made narrow enough that a shoelace must be pulled with a considerable force to move the shoelace along the tubular tie. The pulling force is preferably over 3 pounds, more preferably over 5 pounds, and most preferably over 10 pounds, to resist movement of the shoelace after it reaches its desired position at the outer part 32A of the shoelace end portion. If the shoelace is too loose, a tapered pin 136 can be used to fix its position and prevent its movement along the shoelace even with a pulling force of 10 pounds. Thus, the joining device requires more force to remove from the shoelace than the force (e.g. 3 pounds) applied by a child to close or open the clamp.

FIG. 8 illustrates another joining device 80 which includes a strip 82 of material such as stainless steel, which is bent into a pair of loops 84, 86. The first loop 84 is designed to be crimped onto the outer shoelace part 32. Initially, the loop 84 is large enough to thread a shoelace therethrough. A person then applies pliers to crimp the loop to the shoelace to substantially permanently install it thereon. The second loop 86 extends by somewhat more than 180°, such as 210° about the loop axis 90, and is designed so a child can press the shoelace part 34 therein to temporarily hold the shoelace part in place. The child can later pull out the shoelace part. An adult can squeeze the opposite sides of the opening 92 together or pry them apart to firmly clamp onto a shoelace of given cross section. The material 82 is preferably in strip form to hold the shoelace ends so they do not fall out even though the shoelace end portion is dropped after the parts 32, 34 are joined together by the joining device. Applicant prefers that the length L of the device be a plurality of times longer than the thickness of its material.

Thus, the invention provides a joining device which is adapted to hold outer and inner parts of a shoelace end portion together to maintain a loop configuration. The joining device is preferably substantially permanently attached to the outer shoelace part and is constructed so a young child, of an age such as four or five of average strength and dexterity, can readily join the device to the inner part of the shoelace end portion. A joining device is preferably attached to one of the shoelace parts in a manner that allows a parent to readily install it thereon, and preferably to allow a parent but not a young (4 or 5 year old) child to remove it therefrom. This allows a parent to buy a separate joining device and install it on a preexisting shoelace. One joining device is a clamp type which bears a congratulatory message and can be clamped on an article of clothing of the child after he has learned to tie a bow without the aid of the joining device. The joining device can be part of a combination that includes a shoe device such as a piece of cardboard that simulates a shoe, and a shoelace thereon.

Although particular embodiments of the invention have been described and illustrated herein, it is recognized that modifications and variations may readily occur to those skilled in the art, and consequently, it is intended that the claims be interpreted to cover such modifications and equivalents.

I claim:

1. A shoe device and shoelace combination for use by young children or the handicapped, which includes a shoelace having first and second opposite end portions that can be tied in a bow, by first bringing a pair of spaced shoelace parts on the first end portion together to form a shoelace loop and by holding the shoelace parts together while other tying steps are performed, characterized by:

a shoelace joining device for temporarily holding said shoelace parts together, said joining device having first and second adjacent and permanently connected shoelace-holding portions each forming a passage part through which said shoelace parts can pass, with said second holding portion being child-mountable on one of said shoelace parts and with said first holding portion being fixed in a child-resistant attachment to the other of said shoelace parts, so when both said shoelace parts are held in said joining device said shoelace is held in a shoelace loop to aid in tying a bow.

2. The combination described in claim 1 wherein:
said joining device includes two clamp parts that can clamp said second shoelace part between them, and a flexible strip that joins said clamp parts and that extends about said first shoelace part and that is fixed thereto so a child cannot readily remove it even when said clamp parts are separated.

3. The combination described in claim 1 wherein:
said joining device includes two clamp parts that releasably latch together when clamped together, and that can be pressed against opposite sides of said second shoelace part to capture it, said first portion of said joining device which is held in a child-resistant attachment to said first shoelace part to prevent child removal, being detachable by an adult from said first shoelace part, and one of said clamp parts carries a message congratulating a child for his/her ability to tie his/her shoelace and being clampable onto shirt fabric to enable a child to display the clamp message on his/her shirt.

4. The combination described in claim 1 wherein:
said joining device includes material bent to form two loops that comprise said shoelace holding portions, with a first of said loops substantially permanently fixed about said first shoelace part and said second loop having an opening which is just wide enough to enable a child to force said second shoelace part through said opening.

5. The combination described in claim 1 wherein:
said shoelace parts include inner and outer parts, with said inner part lying closer to said second end portion than said outer part;

said first shoelace holding portion is substantially permanently joined to said outer shoelace part, but not to said inner shoelace part.

6. The combination described in claim 1 wherein:
said shoe device comprises a plate-like member with markings thereon which depict at least part of a shoe with a pair of eyelets, said member having holes at said eyelets through which said shoelace is threaded.

7. Apparatus which is useful by young children and handicapped persons, said apparatus for use with a shoelace that has opposite end portions extending from a shoe device, to hold first and second parts of a first shoelace end portion together to maintain shoelace loop, said apparatus comprising:

a shoelace joining device which has first and second adjacent and permanently connected shoelace-holding portions that each forms a passage through which a corresponding one of said shoelace parts is adapted to extend, with said second holding portion being child-mountable on one of said shoelace parts, and said first holding portion comprising a flexible strip and including a tie that encircles said strip and is adapted to hold to a shoelace in a connection that resists removal by a child more than the detachment of said second holding portion from said shoelace.

8. The apparatus described in claim 7 including:
a plate-like piece of material having markings representing a shoe with a toe portion and forming said shoe device, and a shoelace mounted on said shoe device with said first part of said shoelace joining device mounted on said shoelace, with said plate-like piece being cut out to follow at least said toe portion to form at least part of the outline of a shoe.

9. A method which can be carried out largely by a young child or by a handicapped person who has about the same ability as a young child, to tie a bow in a shoelace that has a centerline and that lies on a shoe, by bringing together a pair of spaced shoelace parts of a first end portion of the shoelace to form a shoelace loop and holding the shoelace parts together while other tying steps are performed, comprising:

substantially permanently attaching a clamp to only a first of said shoelace parts, wherein said clamp has a pair of clamp members that latch together to trap a second shoelace part between said clamp members, so said clamp cannot be readily removed from said first shoelace part by a child;

bringing said first and second shoelace parts adjacent to each other, and moving said clamp members against opposite sides of said centerline at said second shoelace part until said clamp members latch together with said second shoelace part trapped between them, all by the use of the hands of said young child.

10. The method described in claim 9 including:
opening said clamp to release said second shoelace part, and detaching said clamp from said first shoelace part;

clamping said clamp onto an article of child's clothing.

* * * * *